(12) United States Patent
Brandes et al.

(10) Patent No.: US 11,176,429 B2
(45) Date of Patent: Nov. 16, 2021

(54) COUNTER RARE TRAINING DATE FOR ARTIFICIAL INTELLIGENCE

(71) Applicant: International Business Machines Corporation, Armonk, NY (US)

(72) Inventors: Markus Brandes, Holzgerlingen (DE); Frederik Frank Flöther, Schlieren (CH); Andrea Giovannini, Zurich (CH); Florian Graf, Niederhasli (CH); Stefan Ravizza, Wallisellen (CH)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 16/410,192

(22) Filed: May 13, 2019

(65) Prior Publication Data

US 2020/0364520 A1    Nov. 19, 2020

(51) Int. Cl.
*G06K 9/66*  (2006.01)
*G06K 9/62*  (2006.01)
*G06N 20/00* (2019.01)

(52) U.S. Cl.
CPC ............ *G06K 9/66* (2013.01); *G06K 9/6215* (2013.01); *G06K 9/6224* (2013.01); *G06K 9/6259* (2013.01); *G06N 20/00* (2019.01)

(58) Field of Classification Search
CPC ...... G06K 9/66; G06K 9/6259; G06K 9/6215; G06K 9/6224; G06K 9/6271; G06N 20/00

See application file for complete search history.

(56) References Cited

U.S. PATENT DOCUMENTS

| | | | |
|---|---|---|---|
| 5,872,865 | A | 2/1999 | James |
| 7,327,885 | B2 | 2/2008 | Ajay |
| 8,774,515 | B2 | 7/2014 | Thomas |
| 8,787,683 | B1 | 7/2014 | Hector |
| 9,251,185 | B2 * | 2/2016 | Kumar ............. G06F 16/215 |

(Continued)

FOREIGN PATENT DOCUMENTS

WO    2017158058 A1    9/2017

OTHER PUBLICATIONS

Wang et al., "A Systematic Study of Online Class Imbalance Learning with Concept Drift", IEEE Transactions on Neural Networks and Learning Systems, vol. XX, No. X, Feb. 2017, arXiv:1703.06683v1 [cs.LG] Mar. 20, 2017, 18 pages.

*Primary Examiner* — Bobbak Safaipour
(74) *Attorney, Agent, or Firm* — Brian M. Restauro (57) ABSTRACT

A system for enhancing a classifier prediction in respect to underrepresented classes may be provided. A classifier system trained with training data to build a model is used for classifying unknown input data, and an evaluator engine adapted for a determination of an underrepresented class. Additionally, the system comprises an extractor engine adapted for an extraction of relating data from an additional source, and a similarity engine adapted for a selection of data sets out of the relating data wherein the similarity engine is also adapted for comparing features of the relating data and a representative data set for the underrepresented class. Finally, the system comprises a recursion unit adapted for triggering the evaluator engine, the extractor engine and the similarity engine treating selected data set as input data until the evaluator engine classifies the selected data set with a confidence level which is above a confidence threshold level.

20 Claims, 5 Drawing Sheets

(56) References Cited

U.S. PATENT DOCUMENTS

| | | | |
|---|---|---|---|
| 10,546,232 | B2 | 1/2020 | Yandong |
| 11,010,692 | B1* | 5/2021 | Mazor .................... G06N 20/00 |
| 2008/0103996 | A1* | 5/2008 | Forman ................. G06N 20/00 |
| | | | 706/12 |
| 2015/0052090 | A1 | 2/2015 | Ching-Yung |
| 2016/0092789 | A1 | 3/2016 | Codella |
| 2019/0325259 | A1* | 10/2019 | Murphy ............... G06K 9/6259 |
| 2020/0044852 | A1* | 2/2020 | Streit .................. G06F 21/6245 |
| 2020/0279616 | A1* | 9/2020 | Rooney .................. A61P 35/00 |
| 2020/0286614 | A1* | 9/2020 | Do ........................ G16H 30/40 |
| 2020/0364855 | A1* | 11/2020 | Ha ........................... G06T 3/60 |
| 2021/0249142 | A1* | 8/2021 | Lau ....................... G16H 50/50 |

\* cited by examiner

| 402 PROVIDE A TRAINED CLASSIFIER SYSTEM |

| 404 DETERMINE AN UNDERREPRESENTED CLASS |

| 406 DETERMINE A CORRELATION FACTOR VALUE |

| 408 SELECT DATASETS OUT OF THE RELATING DATA |

| 410 REPEAT THE STEPS 404, 406, 408 UNTIL A STOP CONDITION OCCURS |

COUNTER RARE TRAINING DATE FOR ARTIFICIAL INTELLIGENCE

BACKGROUND

The invention relates generally to a system for better machine-learning and more specifically, to a system for enhancing a classifier prediction in respect to underrepresented classes. The invention relates further to a method for enhancing a classifier prediction, and a computer program product.

Developing software in the field of artificial intelligence (AI) and machine-learning and integrating them into existing application is a key challenge in the IT (information technology) industry today. Over the last years, development became more and more a composing of existing elements which continues to evolve into a paradigm shift in how algorithms are developed in the future—programming becomes labeling and the coding is replaced by having the computer solve optimization problems represented through e.g., AI, neural networks, and in particular deep learning. This phenomenon may be called "Software 1.0 vs. Software 2.0 development". Thus, there is a growing need for having the same support for Software 2.0 development through IDE (integrated development environments) like concepts and software stacks, as available for Software 1.0 to develop enterprise-grade AI solutions.

One of the industry pain points is labeling images for a training of a system or method: (i) it is very time consuming to label images so that automation is needed; (ii) rare cases can lead to issues and biases in a system or method which must be addressed. Manual labeling is a huge burden for data scientists because it is mainly a manual process requiring highly skilled people who, on the other side, may also not be free from biased views.

A comparison of time spent during a typical PhD thesis and real life use cased may illustrate the dilemma PhD students spend about 5 to 10% on data sets and an overwhelming "remaining time" of more than 90% on models and algorithms In practical use cases of a company like, e.g., Tesla, about 75% of project time is spent on data preparation and data sets, and only 25% on models and algorithms (source https://vimeo.com/272696002).

One of the issues is in the field of rare cases which—in this context—are image categories or examples of situations where especially in the training data sets only a small number of examples occur, or the examples are very much underrepresented compared to other cases. Some examples may be: (i) images of car accidents compared with normal conditions on the street, (ii) Images of traffic lights with amber or even blue compared to green or red, (iii) Special street signs, and (iv) snow on the street or a foggy environment.

The problem with a trained machine-learning model can be that if one has have 9,999 persons with brown eyes and 1 person with blue eyes in the training set then the algorithm might always predict brown eyes. This leads to an accuracy of 99.99% which is very high, but "blue eyes" is never predicted. If rare cases are ignored, in many settings, such as street traffic, such deficits likely entail major issues.

There are several disclosures related to a system or a method for enhancing a classifier prediction in respect to underrepresented classes. The Document "A Systematic Study of Online Class Imbalance Learning with Concept Drift", IEEE Transactions on Neural Networks and Learning Systems (Volume: 29, Issue: 10, October 2018) discloses a method of handling concept drift in class-imbalance data streams by learning an underrepresented class. The reference also discloses a method of retaining the class based on a window with up-to-date examples.

The document "Class Imbalance and Active Learning", by Josh Attenberg et al., published by Imbalanced Learning: Foundations, Algorithms, and Applications (2013): p. 101-149 (https://pdfs.semanticscholar.org) discloses a method of enabling a model capable of reflecting the true nature of the minority class in preventing the resultant model from being skewed towards the majority class. The reference also discloses a method of addressing underrepresented classes by utilizing examples to retrain the model.

Despite the mentioned references, and in order to address today's industry challenges in the field of machine-learning, it may be required to focus more on rare case management and how to deal with them if the available training data do not have a good mix of examples to learn from.

SUMMARY

According to one aspect of the present invention, a system for enhancing a classifier prediction in respect to underrepresented classes may be provided. The system may comprise a classifier system trained with training data to build a model usable for a classification of unknown input data into prediction classes, an evaluator engine adapted for a determination of an underrepresented class in the prediction classes, wherein the evaluator engine may use a confidence level distribution of the predictions, and an extractor engine adapted for an extraction of relating data from an additional source, wherein the relating data may relate to the determined underrepresented class.

Additionally, the system may comprise a similarity engine adapted for a selection of data sets out of the relating data. Thereby, the similarity engine may also be adapted for comparing features of the relating data and a representative data set for the underrepresented class, and a recursion unit adapted for triggering the evaluator engine, the extractor engine and the similarity engine treating selected data sets as input data until the evaluator engine classifies the selected data set with a confidence level which is above a confidence threshold level.

According to another aspect of the present invention, a computer-implemented method for enhancing a classifier prediction in respect to underrepresented classes is provided. The method may comprise providing a classifier system trained with training data to build a model usable for a classification of unknown input data into prediction classes, determining an underrepresented class in the prediction classes by determining a confidence level distribution of the predictions, and extracting relating data from an additional source, the relating data relating to the determined underrepresented class.

Furthermore, the method may comprise selecting data sets out of the relating data by comparing features of the relating data and a representative data set for the underrepresented class, and repeating the evaluating, the extracting and the selecting by treating the selected data set as input data until the selected data set is classified with a confidence level which is above a confidence threshold level.

The proposed system for enhancing a classifier prediction in respect to underrepresented classes may offer multiple advantages and technical effects.

Clearly, a better management of rare cases in machine-learning can be achieved. The system and the related method care themselves about unbalanced training data sets. The proposed techniques may supervise itself and care about itself and find alternatives autonomously if a prediction of, e.g., a classifier is uncertain about its own results. An internal evaluator detects such imbalances and may look automatically for other examples to be used for enhancing a training data set. This may be seen as an inside out approach in that the system may determine that a training data set could have not been good enough and determine to go outside the system—i.e., outside the available data for training and search for alternative sources. Thus, the system may "bypass the trainer" having provided the training data set and may determine that is could be better "to make its own experiences".

For that purpose, external databases—typically available via the Internet—may be used and accessed to find out (to determine) whether the found data may be used for a better training of the existing machine-learning algorithm.

As a consequence, one may start with a pretty basic training data set and let the system find and enhance its own training data set. Hence, requirements for labeling training data may be reduced due to an auto-labeling process that may be performed as a side effect of the here proposed concept.

The in this concept used similarity engine may be used to spot images that contain numerous similar features between multiple images. The algorithm may take images as input and may give a rating from 0 to 1, where a higher value indicates a better match between the pictures. The processing of the pictures or images may be based on image analytics, i.e., to find distinguishable features by image thresholding, image gradients, and convolutions. First, features may be calculated in the images, then the values and numbers of the images are compared and integrated to gather the values for all promising image couples.

Newly found images, which are then predicted with a high confidence, may be added to the training set to improve the general multi-class model over time. The label may be derived from the class that may have been underrepresented and which may have triggered the complete loops for "going outside".

In the following, additional embodiments of the inventive concept—applicable to both, the system and the method—will be described.

According to one useful embodiment of the system, the input data may be images. For the time being, this may be the most predominant use case; however, the system and the related method may be suited for any other data types. Thus, the proposed concept is not limited to image data only but may be applied to any kind of machine learning.

According to a further useful embodiment of the system, the images data may be extracted out of video data. Thus, this may increase the number of available images significantly, because videos may be seen as a simple concatenation of still images.

According to one preferred embodiment of the system, the determination of an underrepresented class may be based on a function of a difference between the prediction class and other classes. If, e.g., in 98+% of all predictions 9 of 10 classes are always predicted, this may have two reasons: (i) the input data for the classifier may be biased, i.e., the input data may give no reason to predict the 10th class, or (ii) the training model underlying the classifier does not "see" the last class because it has not been reflected accordingly in the training data set.

According to one preferred embodiment of the system, the additional data may be data external to the training data and external to regular input data. Thus, the system does not only rely on the used data for training but may try to access data from "outside the system", i.e., "look beyond its own nose". The additional data may be found in digital libraries for, e.g., additional images, or dictionaries for additional text examples. Other external sources may be imagined easily. One way to access external data may also include the option to integrate a search engine of accessing a search engine to search for additional external data via the Internet. In another embodiment the search may be limited to an intranet.

According to one preferred embodiment, the system may also comprise a labelling unit adapted for labelling the selected data set as additional training data set if the evaluator classifies the selected data set with a confidence level above a confidence threshold level. Hence, an automatic determination may be made to enhance the existing training data set with newly found data outside the so far existing experience horizon—i.e., the training data set used for the actual training—in order to expand the training data set to be used as a broader ground truth base.

According to another preferred embodiment of the system, the labelling unit may also be adapted for annotating the additional training data set with the label relating to the underrepresented class. The additional training data set may comprise one or more additional training data examples for which an auto-tagging or labeling for the data to be newly integrated in the training data set may be used. Thus, there may be no need for a manual interaction with the machine-learning system in order to broaden its experience base, i.e., the training data set. Also the subsequent re-training of the machine-learning system may be triggered automatically if a predefined number or amount of additional training data may have become available.

According to one optional embodiment of the system, the recursion unit may also be adapted for stopping the triggering if a predefined number of recursions have happened. This may prevent an infinitive loop of the search process for additional, external data. Thus, it may be avoided to unnecessarily use system resources.

According to further optional embodiments of the system, the evaluator engine and/or the extractor engine may be connected to a knowledge graph system. The organization of data in the knowledge graph system may be used by the evaluator and/or the extractor engine to determine which additional, external data may be useful to further investigate whether the data are useful for the machine-learning process.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'enhancing a classifier prediction' may denote the process of helping a classifier system to make better predictions, i.e., classify input data more accurately into prediction classes. This may be done especially for rare cases, i.e., those cases that may only happen rarely and which may be underrepresented in the training data set.

The term 'underrepresented class' may denote a class of a classifier which may more or less never—or close to never—be predicted because the underlying machine-learning model has not been trained enough for this class because the training data set has too few examples of the underrepresented class.

The term 'classifier system' may denote a machine-learning system and/or model in the form of a neural network, a deep neural network, a random forest system, a logistic regression system, a Gaussian regression system, and others. Any classifier may be used. The classifier system and the proposed concept may relate to a trained classifier which has been trained with a training data set.

The term 'evaluator engine' may denote a unit enabled to determine whether a case of input data may relate to a rare case. For this, the evaluator engine may use different threshold approaches. One may be a relative threshold approach comparing confidence levels of a prediction resulting in a plurality of classes with confidence level that have a comparable small difference to each other. Hence, a 'confidence level distribution' may be used as determination basis.

The term 'extractor engine' may denote a unit of the proposed system and be able to access external data sources which may be comparable in a predefined sense to the rare case example. A search engine may be used by the extractor engine—or may be part of it—in order to identify related data sets to the rare case data set. Based on this, a 'similarity engine' may determine—also based on thresholds—whether the similarity between the identified, additional examples of the extractor engine are related enough to the rare case.

The term 'additional source' may denote a source of potential training data which may have not been used so far to develop the machine-learning model, i.e., the classifier. The additional source may belong to a data pool independent of the so far available training data. The additional source may be a set of libraries and/or repositories which may be accessible via the Internet, or in other cases, via an intranet of one or more enterprises.

The term 'recursion unit' may denote a unit controlling a triggering of other units in a predefined sequence. In this case, the recursion unit may trigger at least the evaluator engine, the extractor engine and the similarity engine in a sequence until an exit condition is met.

In the following, embodiments will be described referring to the figures.

Figure 1:
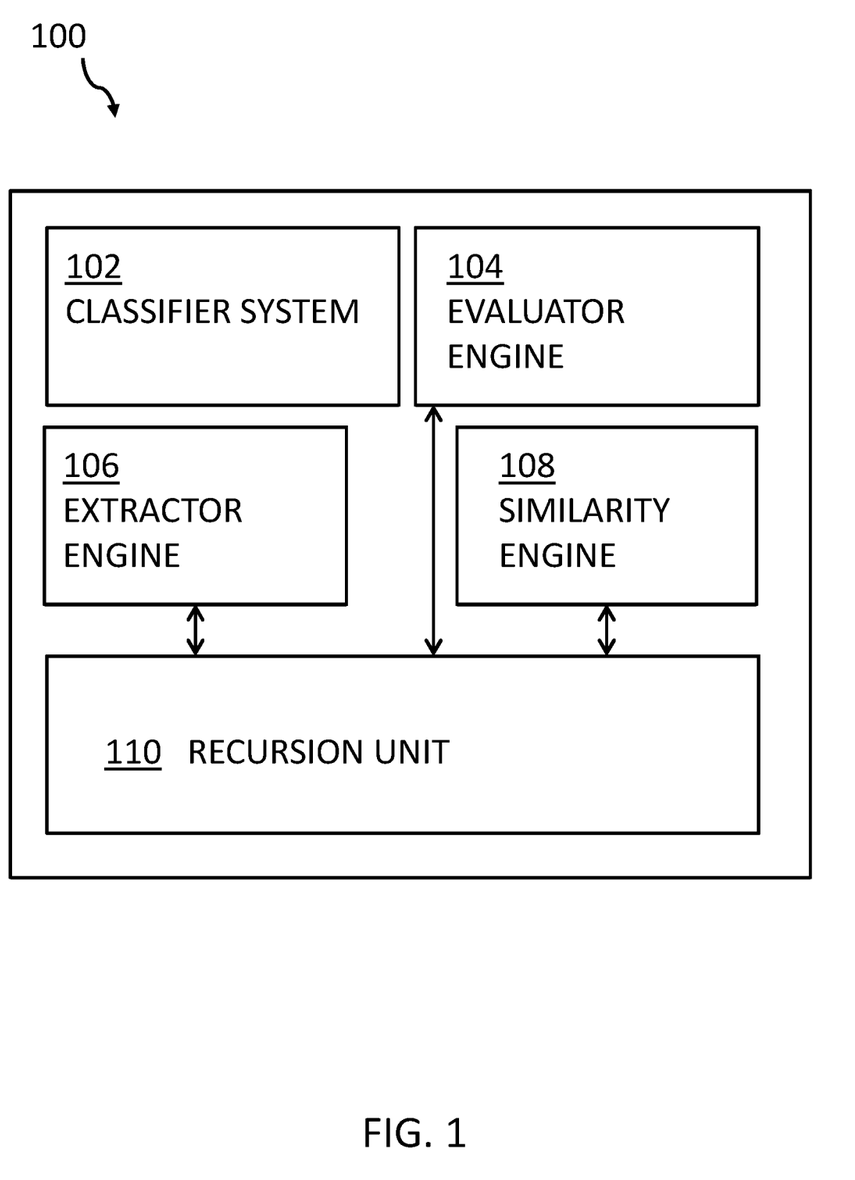
FIG. 1 shows a block diagram of an embodiment of the inventive system for enhancing a classifier prediction in respect to underrepresented classes.

FIG. 1 shows a block diagram of an embodiment of the system 100 for enhancing a classifier prediction in respect to underrepresented classes. The system 100 comprises a classifier system 102 trained with training data to build a model usable for a classification of unknown input data into prediction classes. Examples for the classifier system may comprise a neural network—in particular a deep neural network—a logistic regression system, a Gaussian regression system, a random forest system.

Additionally, the system 100 may comprise an evaluator engine 104 adapted for a determination of an underrepresented class in the prediction classes. For this, the evaluator engine 104 is using a confidence level distribution of the predictions. This may be implemented as a relative thresholding scheme. If, for one class the confidence level for the prediction of the class is comparably low and other classes may show a comparably high value, this may speak for an uncertainty in regard to the specific prediction. If, on the other side, a confidence level for a prediction may show 90% confidence and for other classes it may be in the one digit range, the confidence level in comparison to the confidence level for the other prediction classes is so much higher that this class may not represent an underrepresented class.

Furthermore, the system 100 may comprise an extractor engine 106 adapted for an extraction of relating data from an additional—in particular external—source. Thereby, the relating data relate to the determined underrepresented class, i.e., to a specific input data being classified only vaguely. This is the compelling event for the machine-learning system in which its "experience" may be expanded, i.e., in which new training data are preselected in order to be investigated a bit more.

For this, the method 100 also comprises a similarity engine 108 adapted for a selection of data sets out of the relating data, wherein the similarity engine is also adapted for comparing features of the relating data and a representative data set for the underrepresented class. Thus, the similarity engine looks for "things it knows already" and tries to identify examples for the class for which only a limited number of training data are available in the machine-learning training data set. Thus, a directed search is performed, in particular, to look for training data which have not been available originally but which are absolutely required for a reliable and trustful classifier system.

Last but not least, the method 100 comprises a recursion unit 110 adapted for triggering at least the evaluator engine, the extractor engine and the similarity engine treating the selected data set as input data until the evaluator engine classifies the selected data set with a confidence level which is above a confidence threshold level. Hence, the proposed concept does not rely on a "first shot" for expanding the training data set for the machine-learning model, i.e., the classifier, but for a focused target-oriented search for new data to learn from. For this purpose, the recursion unit 110 is connected to the evaluator engine 104, extractor engine 106 and the similarity engine 108.

Figure 2:
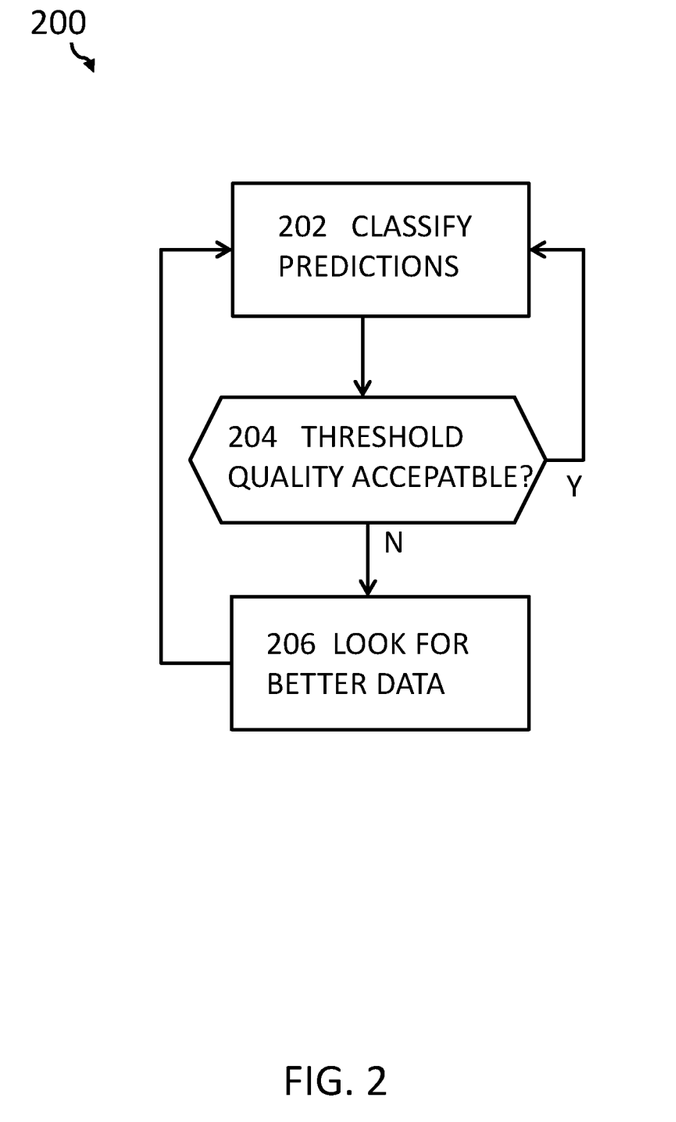
FIG. 2 shows a block diagram of a simplified embodiment of the proposed concept.

FIG. 2 shows a block diagram of a simplified embodiment of the proposed concept. A trained classifier 202 may be used regularly for an evaluation of input data to perform classifications. The system 200 is controlling its own prediction output using an evaluation process 204 whether its own predictions are "good enough". If that is the case—"Y"—the classifier continues with its predictions unchanged. However, if it turns out that the evaluation 204 may not be good enough—case "N"—the system looks, 206, for additional, external data ("better data") which may be used in a new training of the underlying machine-learning model of the classifier 202. Whether the "predictions are good" enough can be determined by using a metric comparing relative differences in the class probabilities. Hence, the prediction is, e.g., accepted if a significant distance exists from the other classes. The significant distance may, e.g., be determined by a predefined threshold value, either a percentage value or an absolute value.

This simplified embodiment may render the here proposed concept comprehensible. Thus, a self-optimizing machine-learning system is proposed that tries to expand its experience horizon if it is determined that the results are not good enough. The term "tries to expand its experience horizon" can be seen as a synonym for expanding the used data basis (by a new search for additional data) used for predictions if the predefined threshold value for a difference between the main predicted class and, e.g., a second other class is not reached.

Figure 3:
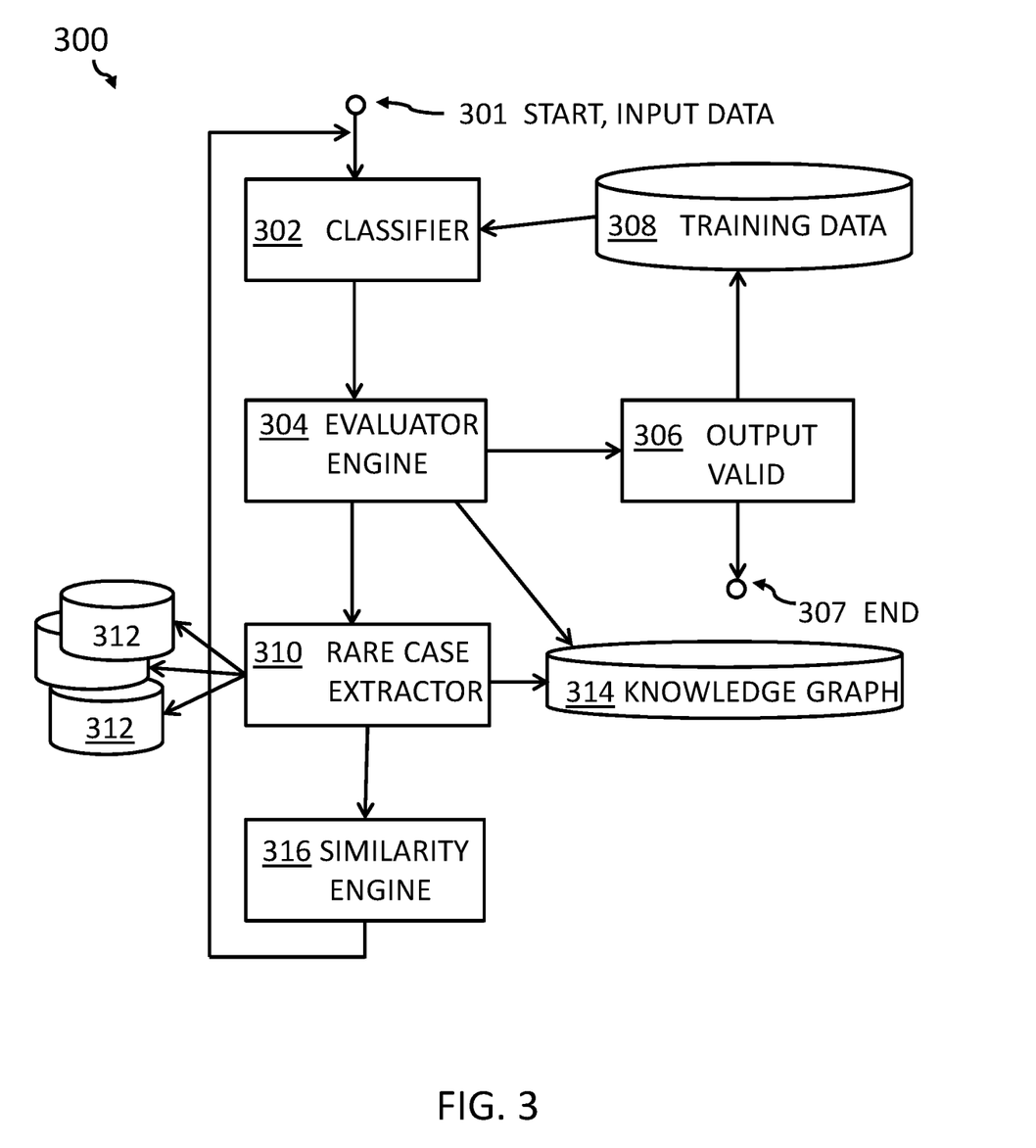
FIG. 3 shows a block diagram of an embodiment of a more complete system.

FIG. 3 shows a block diagram of an embodiment of a more complete system 300. The initial situation and condition may be described as: the classifier 302 may be trained with a multi-class model for n different classes. q classes (q<n) are underrepresented in the training data set, i.e., (the number of samples in the class<the number of overall samples/(n*(|mean-median|)), also called rare cases. Different thresholds may be used to define a rare case and the |mean-median| factor is one example for an implementation. The inherent problem may be described as: during training, the classifier might learn the distribution in the training data set instead of the features that are differentiators in the q classes. The evaluator engine 304, the rare case extractor 310 and the similarity engine 316 may be instrumental to cope with such sort of "mis-training".

As an initial step 301, an image as well as any additionally available meta-data are fed to the classifier 302. It may be noted that for the sake of simplicity the example may be described using image data. However, the proposed concept is suitable for any kind of classification (sound, text, video, health data, stock market data, just to name a few application areas).

The output of the classifier, i.e., the prediction, is fed to the evaluator engine 304, which determines whether the case at hand is a rare case. For this, it may use a knowledge graph 314 for a good interpretation of the confidence level in context to the predicted classes. Hence—and bridging back to the term "good enough"—a rare case is determined if the evaluator engine determines that a difference between the main prediction class and a next prediction class in a ranked series of prediction classes is below a predefined difference threshold value.

If the case is not a rare case, i.e., the confidence value is good enough (above a predefined confidence level threshold value or a maximum number of iterations has been reached), the output of the classifier is valid (306) and fed out (307). Additionally, the data relating to the case may also be used to enhance the training set on a periodic basis, i.e., becomes a component of the training data 308.

If it is determined by the evaluator engine 306 that the case is a rare case, the input data are forwarded to the rare case extractor 310. This module is used to potentially enlarge the corpus of training data with potentially related or similar images. These may be extracted from external data 312—in particular additional databases or completely external data, e.g., identified via a search engine on the Internet—and may be sent to the similarity engine 316 to select most similar images and feed them back to the classifier 302 for the next iteration (go back to start 301).

It may be noted that also the rare case extractor may access a knowledge graph to determine related images in the additional data 312.

In a next iteration, a traffic light may be used as exemplary input image to the classifier 302. However, the image of the traffic light may be sort of undefined and not clearly recognizable (due to an unusual view angle, fog, mist, lamp defect, etc.,). As a result of the classifier 302 it turns out that the classifier 302 returns "stoplight" with a confidence level of 0.712, "lightbulb" with a confidence level of 0.709, "stop train" with a confidence level of 0.698, and so. Thus, the system is "not sure" about its prediction because there are similar but not equal predictions with confidence levels which are pretty close to each other. Thus, a relative measure for the confidence level is used.

The evaluator engine 304 determines that this is a rare case. The extractor 310 may then, as an example, return 230 additional images—e.g., accessing the Internet with a search engine—by looking for stoplight, lightbulb and train stop, i.e., a predefined number or percentage of prediction results of the classifier 302 which difference in confidence levels may be below a predefined threshold value.

Next, the similarity engine 316 may select, e.g., 5 images out of the 230 which show a relative closeness to the input image which are then sent for further processing back to the classifier 302 as input data in the same way normal input data for classifications are input to the classifier 302.

In a further iteration, the classifier 302 determines classes for the five additional images sent from the similarity engine 316 to the classifier 302. The result of the classifier may be:

image 1: "stoplight", confidence level 0.812; "lightbulb" confidence level 0.809; "train stop", confidence level 0.498;

image 2: "stoplight", confidence level 0.612; "lightbulb" confidence level 0.609; "train stop", confidence level 0.598; and so on for all identified and additional images. It may also be noted that the classifier is a trained classifier which has been trained with annotated training data to automatically determine an internal model to be used for classifications. Typically, also the number of classes is given as input (beside the images) to the classifier during the raining session.

Next, the evaluator engine 304 evaluates the confidence level of all five additional images. At least one is not classified as a rare case and sent as output to the right, i.e., to the valid output box 306 because of its relative confidence level which is above a predefined threshold value. This image may then be used to enhance the training data set 308, so that more examples of rare cases are accumulated in the training data set 308. A re-training—which may happen whenever a predefined number of additional training data (absolute number or relative number) have been added to the training data set 308—will now modify the underlying machine-learning model for the classifier 302 so that in future a recognition, also of rare cases is enhanced.

However, for the remaining images not being added to the training data set 306 the loop continues. For these four remaining images, the rare case extractor 310 may find additional 350 images by accessing external data sources looking again for "stoplight", etc. In this situation, 7 images out of the 350 images are selected as close to the input images and are sent to further processing in a further iteration loop of the system. This loop process may continue until a predefined number of iterations has been performed.

Now, looking at the individual units in a bit more detailed fashion: the evaluator engine 304 is used in order to decide whether the output of the classifier 302 is a rare case (compare above), to determine whether an iteration in the main process is needed. The condition used by the evaluator engine 304 is based on the confidence level distribution of the predictions. In particular, the prediction is accepted if the most important class has a significant distance—in particular of the confidence level—from the other classes. The distance is controlled by a predefined threshold value. A further exit condition, were there is no further iteration in the main process and the output of the classifier 302 is considered valid, is that a certain number of iterations has already been carried out in the main process.

To better consider the different prediction confidence levels, a knowledge graph may be used as reference. The closer the distance between two predictions, the more likely it is that both are true and vice versa.

The extractor 310 (or rare case extractor) is used to access external data. There is a growing amount of video material available. This may come, for example, from "smart glasses" (googles), video cars (used to support automatic map generation of geographic locations), autonomous vehicles equipped with cameras, and the like. It is possible to analyze and classify the images that constitute the videos. These classified images can then be compared with a database of "rare cases", i.e., images relevant to some machine-learning classes but where only a few examples exist. This comparison may use techniques such as similarity learning and principal component analysis. Any images that were determined to be part of a category of rare cases will then be extracted and fed into the rare case database in order to be used in training new and improved classifiers. The rare case categories can be changed over time; e.g., once a sufficient number of cases for a certain category have been accumulated, that category would no longer be considered rare. It may also be noted that over time this process will shift which classes are considered to be the ones with rare cases. Thus, a periodic update of the "rare case" label for the classes may be needed. Depending on hardware requirements of the reaction of the system, all images are used one after the other independently or one every n frames. The natural consequence of using the here proposed process is that chronologically less and less rare cases will get identified as the training set gets get larger the more images it processes.

The similarity engine 316 is used to spot images that comprise numeral similar features between multiple images. The algorithm e.g., an SSIM (structural similarity) or a PSNR (peak signal-to noise ratio) algorithm may take images as input and may give it a rating from 0 to 1, wherein a higher value indicates a better match between the images. The processing of the images is based on image analytics, i.e., finding distinguishable features by image thresholding, image gradients, and convolutions. First features are calculated in the images, then the values and characterizing numbers of the images are compared and integrated together with the values of all promising couplets.

Newly font images which are predicted with a high confidence will be added to the training data set to improve the general multi-class model over time.

Figure 4:
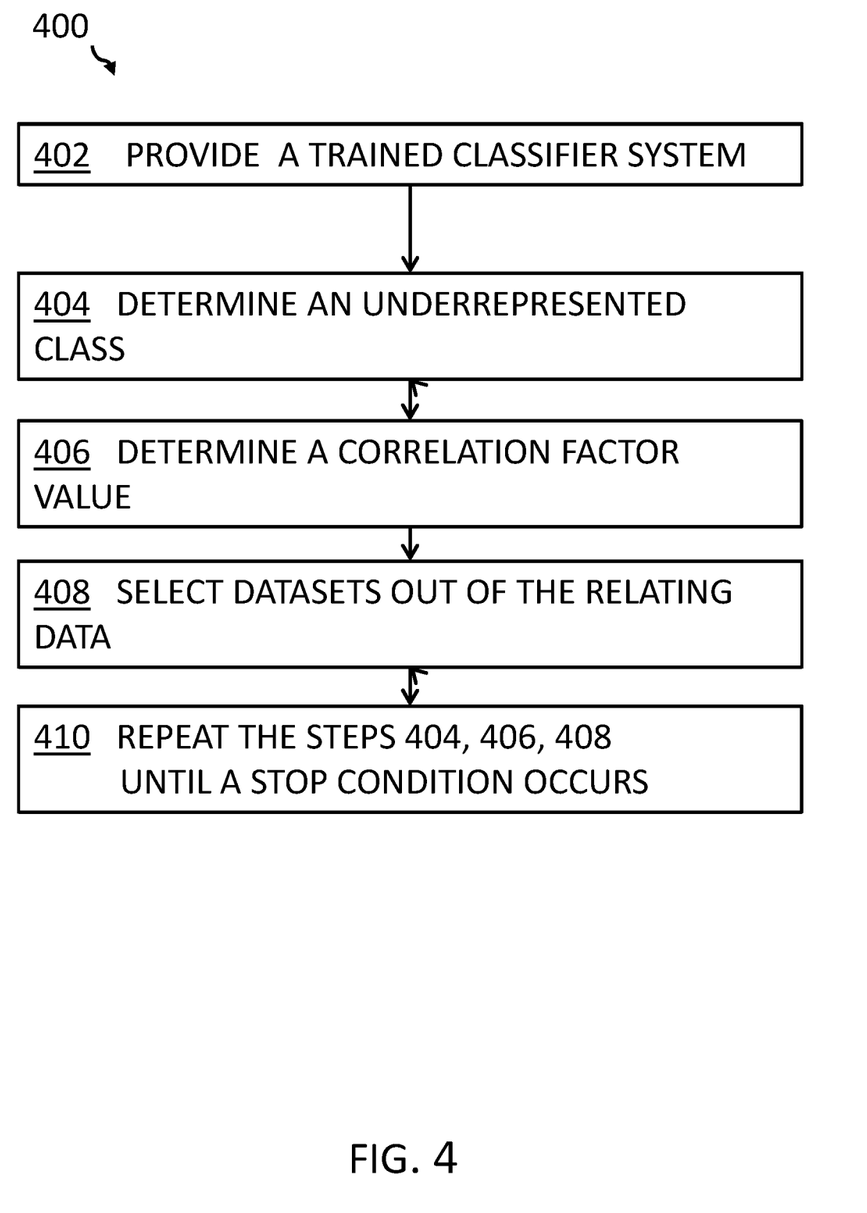
FIG. 4 shows a block diagram of a flowchart of the inventive method for enhancing a classifier prediction in respect to underrepresented classes.

FIG. 4 shows a block diagram of a flowchart of an embodiment of the computer-implemented method 400 for enhancing a classifier prediction in respect to underrepresented classes. The method 100 comprises—in accordance with the related machine-learning system, explained above—providing, 402, a classifier system trained with training data to build a model usable for a classification of unknown input data into prediction classes, determining, 404, an underrepresented class in the prediction classes by determining a confidence level distribution of the predictions, and extracting, 406 relating data from an additional source. Thereby, the relating data are related to the determined underrepresented class.

Additionally, the method 400 comprises selecting, 408, data sets out of the relating data by comparing features of the relating data and a representative data set for the underrepresented class, and repeating, 410, the determining (404), the extracting (406) and the selecting (408) by treating the selected data set as input data until the selected data set is classified with a confidence level which is above a confidence threshold level. Thus, the steps 104, 106 and 108 are repeated until a stop condition occurs. The stop condition may be a threshold value for the confidence level of the specific prediction or may be seen in a predefined number of cycles the search for additional data has been performed. If that is the case, the system may determine that set "may not make sense" to search for additional data to enhance the training data set.

Figure 5:
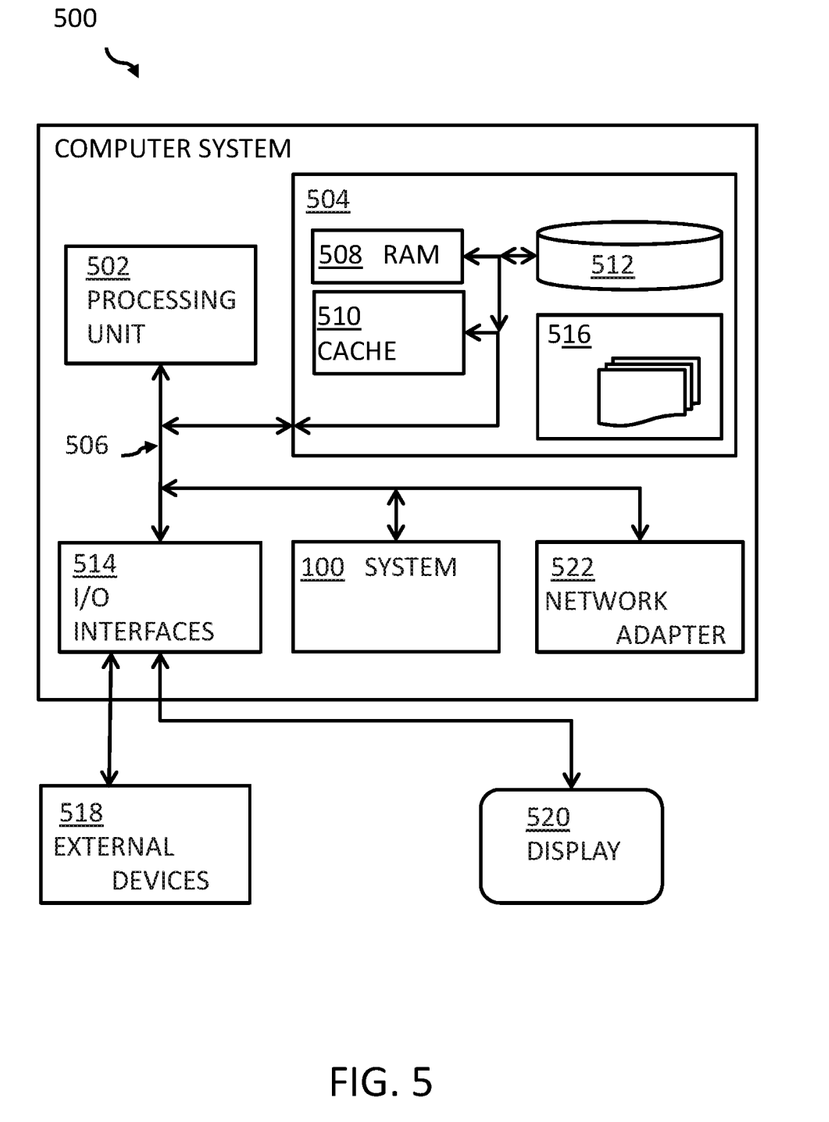
FIG. 5 shows an embodiment of a computing system comprising the system according to FIG. 1.

Embodiments of the invention may be implemented together with virtually any type of computer, regardless of the platform being suitable for storing and/or executing program code. For completeness reasons, FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the system 100 for enhancing a classifier prediction may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer system comprising:
   one or more computer processors;
   one or more computer readable storage media; and
   program instructions stored on the one or more computer readable storage media for execution by at least one of the one or more computer processors:
   a classifier system trained with training data to build a model usable for a classification of unknown input data into prediction classes;
   an evaluator engine adapted for a determination of an underrepresented class in the prediction classes, the evaluator engine using a confidence level distribution of the predictions;

an extractor engine adapted for an extraction of relating data from an additional source that includes one or more features associated with the determined underrepresented class and identification of examples from the related data for which a limited number of training data are available that was not used in previous training and are representative of the one or more features associated with the determined underrepresented class;

a similarity engine adapted for a selection of data sets out of the relating data, comprising one or more features identified representative of the determined underrepresented class, wherein the similarity engine is also adapted for;

searching for additional data sets using the relating data as a basis for a search query, selecting examples within the additional data sets from the results of the search query as candidates for training when an example within the additional data sets exceeds a relative confidence value for features associated with the determined underrepresented class; and a recursion unit adapted for triggering the evaluator engine, the extractor engine and the similarity engine treating selected data set as input data until the evaluator engine classifies the selected data set with a confidence level which is above a confidence threshold level.

2. The computer system according to claim 1, wherein the input data are image data.

3. The computer system according to claim 2, wherein the image data are extracted out of video data.

4. The computer system according to claim 1, wherein the determination of an underrepresented class is based on a function of a difference between the prediction class and other classes.

5. The computer system according to claim 1, wherein the additional data are data external to the training data and regular input data.

6. The computer system according to claim 1, further comprising:

a labelling unit adapted for labelling the selected data set as additional training data set, if the evaluator classifies the selected data set with a confidence level above a confidence threshold level.

7. The computer system according to claim 6, wherein the labelling unit is also adapted for annotating the additional training data set with the label relating to the underrepresented class.

8. The computer system according to claim 1, wherein the recursion unit is adapted for stopping the triggering if a predefined number of recursions have happened.

9. The computer system according to claim 1, wherein the evaluator engine is connected to a knowledge graph system.

10. A computer-implemented method comprising:

providing a classifier system trained with training data to build a model usable for a classification of unknown input data into prediction classes;

determining an underrepresented class in the prediction classes by determining a confidence level distribution of the predictions by comparing relative differences in respective class probabilities;

enhancing the classifier system by extracting relating data from an additional source that includes one or more features associated with the determined underrepresented class, wherein extracting relating data comprises:

identifying examples from the related data for which a limited number of training data are available that was not used in previous training and are representative of the one or more features associated with the determined underrepresented class;

searching for additional data sets using the relating data as a basis for a search query;

selecting examples within the additional data sets from the results of the search query as candidates for training when an example within the additional data sets exceeds a relative confidence value for features associated with the determined underrepresented class, and repeating the evaluating, the extracting and the selecting by treating the selected examples as input data until the selected data set is classified with a confidence level which is above a confidence threshold level.

11. The computer-implemented method according to claim 10, wherein the input data are image data.

12. The computer-implemented method according to claim 11, wherein the image data are extracted out of video data.

13. The computer-implemented method according to claim 10, wherein the determining of an underrepresented class is based on a function of a difference between the prediction class and other classes.

14. The computer-implemented method according to claim 10, wherein the additional data are data external to the training data and regular input data.

15. The computer-implemented method according to claim 10, further comprising:

labelling the selected data set as additional training data set, if the selected data set is classified with a confidence level above a confidence threshold level.

16. The computer-implemented method according to claim 15, wherein the labelling further comprising:

annotating the additional training data set with the label relating to the underrepresented class.

17. The computer-implemented method according to claim 10, wherein the repeating is stopped if a predefined number of recursions has happened.

18. The computer-implemented method according to claim 10, wherein the evaluating is accessing a knowledge graph system.

19. The computer-implemented method according to claim 18, wherein the extraction is accessing the knowledge graph system.

20. A computer program product comprising:

a computer readable storage medium having program instructions embodied therewith, said program instructions being executable by one or more computing systems or controllers to cause said one or more computing systems to:

provide a classifier system trained with training data to build a model usable for a classification of unknown input data into prediction classes;

determine an underrepresented class in the prediction classes by determining a confidence level distribution of the predictions;

enhance the classifier system by extracting relating data from an additional source that includes one or more features associated with the determined underrepresented class, wherein extracting relating data comprises:

program instructions to identify examples from the related data for which a limited number of training data are available that was not used in previous training and are representative of the one or more features associated with the determined underrepresented class, select examples within the additional data sets from the results of the search query as candidates for training when an example within the additional data sets exceeds a relative confidence value for features associated with the determined underrepresented class, and repeat the evaluation step, the extraction step and the selection step by treating the selected data set as input data until the selected data set is classified with a confidence level which is above a confidence threshold level.

* * * * *